United States Patent
Boss et al.

(10) Patent No.: US 8,952,813 B2
(45) Date of Patent: Feb. 10, 2015

(54) OPTIMIZATION OF LUGGAGE PLACEMENT IN STORAGE COMPARTMENTS

(75) Inventors: Gregory J. Boss, Saginaw, MI (US); Andrew R. Jones, Round Rock, TX (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 13/616,722

(22) Filed: Sep. 14, 2012

(65) Prior Publication Data

US 2014/0077952 A1 Mar. 20, 2014

(51) Int. Cl.
G08B 13/14 (2006.01)
G08B 1/08 (2006.01)
H04Q 5/22 (2006.01)

(52) U.S. Cl.
USPC .............. 340/572.1; 340/539.13; 340/10.1; 340/568.1

(58) Field of Classification Search
USPC ........... 340/572.1, 539.13, 10.1–10.6, 568.1; 244/118.5, 118.1, 118.6; 700/213–244
See application file for complete search history.

(56) References Cited

U.S. PATENT DOCUMENTS

| | | | | |
|---|---|---|---|---|
| 4,935,885 A | * | 6/1990 | McHale et al. | 702/175 |
| 5,050,090 A | * | 9/1991 | Golub et al. | 700/217 |
| 6,923,375 B2 | * | 8/2005 | Stefani | 235/462.01 |
| 7,030,760 B1 | * | 4/2006 | Brown | 340/568.1 |
| 7,126,470 B2 | | 10/2006 | Clift et al. | |
| 8,038,098 B2 | | 10/2011 | Johnson et al. | |
| 2006/0017541 A1 | | 1/2006 | Nguyen | |
| 2007/0115123 A1 | | 5/2007 | Roberts et al. | |
| 2007/0241233 A1 | | 10/2007 | Cona | |
| 2009/0015398 A1 | * | 1/2009 | Bhogal et al. | 340/539.13 |
| 2009/0276089 A1 | | 11/2009 | Bartholomew | |
| 2010/0007500 A1 | * | 1/2010 | Mestres et al. | 340/572.4 |
| 2011/0133892 A1 | | 6/2011 | Nohr | |
| 2011/0139929 A1 | | 6/2011 | Young et al. | |
| 2013/0234849 A1 | * | 9/2013 | Gupta et al. | 340/539.11 |

OTHER PUBLICATIONS

"Baggage Tracking RFID Solutions" Industry Brief. Motorola, Aug. 2008, © 2008 Motorola, Inc. <http://www.novacommunications.com/images/productpdfs/Baggage_Tracking_RFID_Solutions.pdf>.

* cited by examiner

Primary Examiner — Jennifer Mehmood
Assistant Examiner — Omar Casillashernandez
(74) Attorney, Agent, or Firm — John W. Hayes

(57) ABSTRACT

Aspects of the present invention disclose a system, method and computer program product for automatically assigning a location to a luggage belonging to a passenger in a passenger carrier. In an example, a computer system evaluates characteristics of the luggage. The computer system evaluates characteristics of the passenger. The computer system assigns a location associated with an RFID tag to the luggage. The computer system confirms the luggage being correctly located in the assigned location.

20 Claims, 5 Drawing Sheets

OPTIMIZATION OF LUGGAGE PLACEMENT IN STORAGE COMPARTMENTS

FIELD OF THE INVENTION

The present invention relates generally to baggage handling and more specifically to optimizing baggage handling efficiency.

BACKGROUND

Modern day transportation has changed in recent times to operate in a more efficient and timely matter. In doing so, the number of passengers being put on an airplane has pushed the interior loading capacity of many airplanes since their overhead storage space is not sufficient enough to accommodate all passengers. When a passenger checks in at pre-flight registration, the passenger has a choice of turning in larger luggage to be placed underneath the cabin of the airplane. Most airlines allow for one small carry-on item that can be place above the passenger in the storage compartment and another small bag that can be placed under the seat in front of the passenger. For overhead compartments located in the cabin of the airplane, the airline is not known to assign an overhead compartment luggage storage area even though the storage compartments are labeled to corresponding seats on the airplane. This is the case since there are some passengers with no carry-on luggage in which the designated storage compartment space for the passengers may be used for another passenger.

Due to rising fuel costs, passengers are charged for every additional piece of luggage the passengers want to check in to be placed in the cargo area of the airplane. This has encouraged passengers to increase the size of the luggage they carry-on to be placed in the overhead bin area of the aircraft. In result, when boarding an airplane, the lack of overhead luggage space for the increase in volume of carry-on luggage has increased flight delays. Flight delays have increased due to the airline making a false assumption that all of the carry-on luggage fits in the overhead bin area. If a piece of luggage does not have space in the overhead bin area, it must be tagged, carried off the airplane and placed in the cargo area of the airplane. As a result, boarding time increases delaying the departure time of the flight.

SUMMARY

Aspects of the present invention disclose a method, computer system, and computer program product for automatically assigning a location to a luggage belonging to a passenger in a passenger carrier.

Embodiments include a system, method and computer program product for automatically assigning a location to a luggage belonging to a passenger in a passenger carrier. In an exemplary embodiment, a computer system evaluates characteristics of the luggage. The computer system evaluates characteristics of the passenger. The computer system assigns a location associated with an RFID tag to the luggage. The computer system confirms the luggage being correctly located in the assigned location.

In another exemplary embodiment, a computer program product includes one or more computer-readable storage media and program instructions stored on at least one of the one or more computer-readable storage media. The program instructions include program instructions to evaluate characteristics of the luggage, program instructions to evaluate characteristics of the passenger, program instructions to assign a location associated with an RFID tag to the luggage, program instructions to confirm the luggage being correctly located in the assigned location.

In another exemplary embodiment, a computer system includes one or more processors, one or more computer-readable memories and one or more computer-readable storage media, and program instructions, stored on at least one of the one or more storage media for execution by at least one of the one or more processors via at least one of the one or more computer-readable memories. The program instructions include program instructions to evaluate characteristics of the luggage, program instructions to evaluate characteristics of the passenger, program instructions to assign a location associated with an RFID tag to the luggage, and program instructions to confirm the luggage being correctly located in the assigned location.

DETAILED DESCRIPTION

Figure 1:
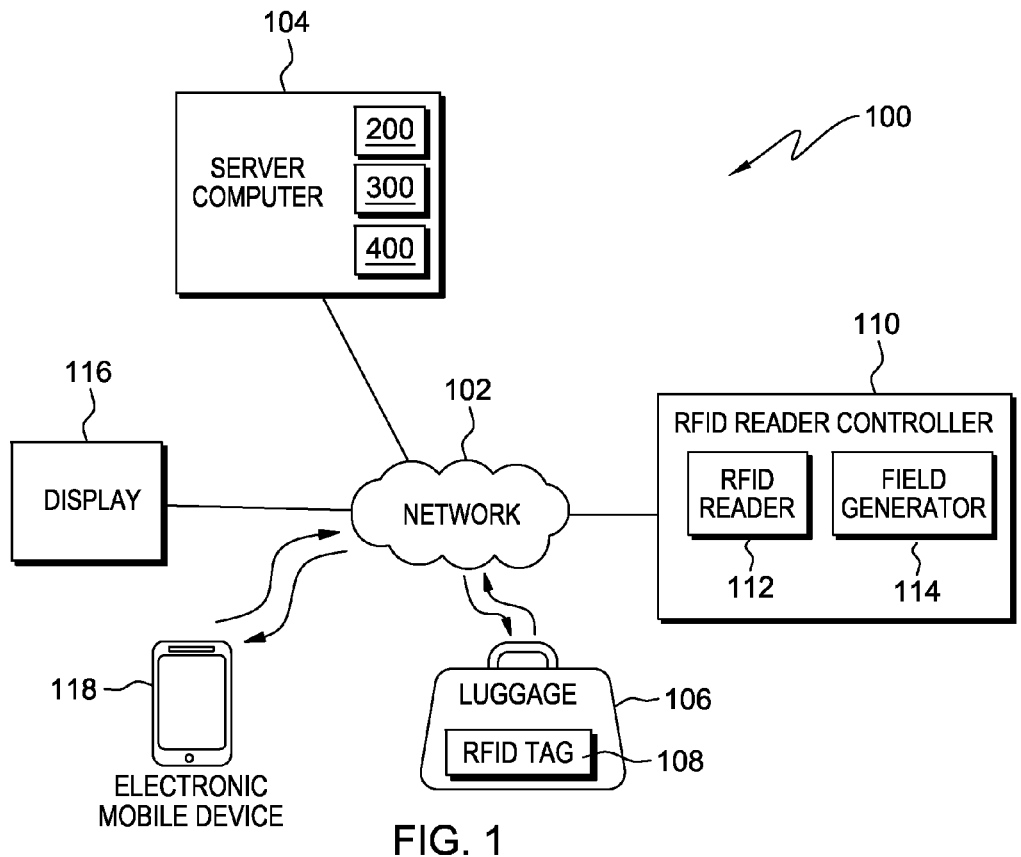
FIG. 1 is a block diagram of an optimization luggage system for storage compartments located on a passenger carrier in accordance with an exemplary embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatuses provide processes for implementing the functions/acts specified in the flowchart and/or block diagram block or blocks.

The present invention will now be described in detail with reference to the figures. FIG. 1 depicts a luggage storage compartment system generally designated 100 according to an exemplary embodiment of the present invention. Luggage storage compartment system 100 is meant to work with a wide range of short range radio technology but will be described in an example embodiment that uses RFID technology.

In an example, a luggage storage compartment system 100 includes a network 102 through which a server computer 104, a RFID tag 108, a RFID reader controller 110 with components RFID reader 112 and a field generator 114, a display 116 and an electronic mobile device 118 are connected. Server computer 104 includes an RFID tag assignment program 200, which associates a passenger's boarding pass with their luggage along with a designated storage compartment. Server computer 104 includes a luggage storage program 300, which utilizes RFID tag technology to assign storage compartment space to passengers on a passenger carrier. Server computer 104 includes a luggage orientation program 400, which utilizes RFID tag technology to notify a passenger how to orient luggage in a storage compartment on a passenger carrier. In an example, luggage 106 has RFID tag 108 that is associated with a unique storage compartment. RFID reader controller 110 analyzes RFID tag 108. RFID reader controller 110 consists of field generator 114 which activates RFID tag 108 and RFID reader 112 which retrieves the information associated with RFID tag 108. Display 116 notifies the passenger when RFID tag 108 is in the vicinity of the correctly associated RFID reader 112. Electronic mobile device 118 guides the passenger with RFID tag 108 on luggage 106 to designated RFID reader 112 associated with a unique storage compartment for the passenger.

An implemented embodiment of luggage storage compartment system 100 may be but not limited to: a passenger aircraft, a passenger bus, a passenger train and a nautical passenger transporter. In exemplary embodiments, luggage storage compartment system 100 operates through network 102. Network 102 is controlled by server computer 104 located in a physical area inside network 102. Server computer 104 includes RFID tag assignment program 200, luggage storage program 300, and luggage orientation program 400 along with preferences that can be adjusted by the user of the programs. Server computer 104 has the ability to support one or more networks 102 in one or more preference configurations.

In an exemplary embodiment, the passenger travels with luggage 106 that includes associated RFID tag 108 that is associated with the passenger. Luggage 106 is not connected through network 102 until server computer assigns RFID tag 108 an associated RFID reader 112. Server computer 104 associates luggage 106 with the passenger placing luggage 106 into the location associated with RFID tag 108 of the passenger carrier. RFID tag 108 is issued with a unique code so luggage 106 is associated with the passenger using the storage compartment on the passenger carrier. RFID tag 108 is attached to luggage 106. RFID reader controller 110 gathers information from all RFID tags 108 that may be in the vicinity of RFID reader 112. RFID reader controller 110 includes at least two operating components. Field generator 114 sends a signal to all RFID tags 108 in the vicinity of RFID reader controller 110. The signal initializes RFID tag 108 located on luggage 106 so RFID reader 112 recognizes signature associated with each unique RFID tag 108. Luggage storage compartment system 100 operates with one or more RFID reader controllers 110. Display 116 is connected through network 102 to server computer 104 to inform the passenger that the luggage 106 associated with the passenger is within the vicinity of associated RFID reader controller 110.

In an example, through the use of navigation tools, electronic mobile device 118 guides the passenger to the location of the storage compartment on the passenger carrier. Electronic mobile device 118 may be but is not limited to: a cell phone, a smart phone, a PDA, a laptop, a net book and a tablet computer. Electronic mobile device 118 is connected through network 102 to server computer 104. In an example, electronic mobile device 118 is connected through a wireless internet connect that is able to send and receive information concerning the location of the storage compartment the passenger uses to store luggage 106. In an example, a frequent flier passenger who regularly travels using the same airline has a phone number associated with the frequent flier passenger on record in the database of the airline. The frequent flier passenger receives a Multimedia Message Service (MMS) on the electronic mobile device 118 associated with the passenger through a cell phone network provider that contains the flight information of the frequent flier passenger. Such an exemplary embodiment may also include a feature where the frequent flier passenger receives the location associated with RFID tag 108.

Figure 2:
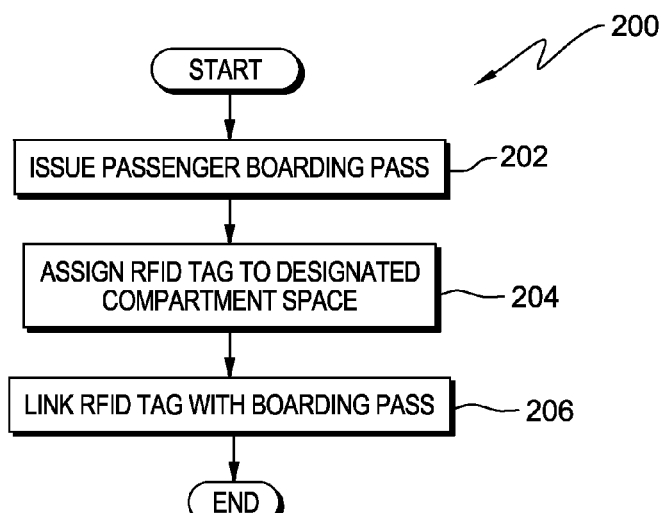
FIG. 2 is a flowchart illustrating steps for RFID tag assignment for luggage being placed in a storage compartment located on a passenger carrier in accordance with an exemplary embodiment of the present invention.

FIG. 2 is a RFID tag assignment program 200 associates luggage 106 with a storage compartment through the use of RFID tag 108. In order for luggage 106 to be associated with a location on the passenger carrier, RFID tag assignment program 200 associates a passenger with luggage 106. The passenger registers for travel on a people carrier by providing the travel details along with luggage 106 which is brought into the seating area of a passenger carrier. Characteristics of luggage 106 are obtained such as the volume along with the weight of luggage 106. In an example, a passenger arrives to an airport and the passenger passes through security before registering for travel, the passenger has characteristics of luggage 106 recorded during the measurement of the size and weight of luggage 106 as it passes through an x-ray machine which measures the necessary dimensions of luggage 106. Standardized sized luggage 106 produced for travel today have an integrated bar code system developed for airport scanning systems to establish the volume of luggage 106. Standardized sized luggage 106 may still require the weight to be taken in order to be properly assigned to a location on the passenger carrier.

After passing through security, the passenger registers for a flight and has luggage 106 details pre-determined. In step 202, RFID tag assignment program 200 issues a boarding pass to the passenger for the passenger carrier. At this point, the passenger carrier operator only assigns the passenger a seat. Luggage 106 information contains the dimensions and weight of luggage 106 going into the cabin of a passenger carrier. Luggage 106 characteristics are recorded and stored temporary to be used to logically place luggage 106 of all the passengers to maximize the space available in the storage compartments in the cabin of the passenger carrier. In an example, a passenger has the option to forfeit assigned space for luggage 106 storage compartments for incentives provided by the operator of the passenger carrier.

In step 204, RFID tag assignment program 200 assigns RFID tag 108 to a designated compartment space. This process is automatic and requires no further input by a third party. RFID tag assignment program 200 has the ability to logically spread luggage 106 among the storage compartments in the cabin of a passenger carrier. In an example, preferences may be entered by a third party so frequent passengers may select their preferred storage compartment at the cost of reducing the maximum storage capacity of the storage compartments. The rest of the storage compartment space is spread accordingly to utilize the maximum space available to store luggage 106 in the storage compartment located in the cabin of a passenger carrier.

In step 206, RFID tag assignment program 200 links boarding pass of the passenger with RFID tag 108 and placed on luggage 106. RFID tag 108 contains the location associated with an RFID which is unique to luggage 106 assigned. In an example, the passenger obtaining the boarding pass is assigned RFID tag 108, which is integrated into the luggage tag that is attached to luggage 106. RFID tag 108 has the information stored therein and placed on the luggage tag to insure all of the information is on a single body attached to luggage 106.

In an example, RFID tag assignment program 200 operates with everyone checking-in for a flight by obtaining a boarding pass along with an associated RFID tag 108 containing a luggage compartment location for luggage 106. RFID tag assignment program 200 assigns the location of where luggage 106 is placed into the storage compartment in the cabin of the aircraft after every passenger checks-in. A frequent flier has a compartment assigned to them already since they have preferences available to them. Every other passenger is assigned a storage compartment once the boarding time for the aircraft begins. Once the boarding process is initialized, passengers are called by their boarding pass to insure the loading process is done efficiently.

In another example, the loading process is initialized based on the assignment of a location associated with RFID tag 108. Passenger characteristics are used to produce a loading procedure for which storage compartments needs to be filled first to optimize loading efficiency. Passenger characteristics may be but not limited to; age, if passenger is traveling with children, personality, limited mobility, type of luggage and gender. This passenger information is used to establish average loading times for every individual passenger. The passengers which require the most time to place luggage 106 into the storage compartment are seated in the back of the airplane and board the airplane first to insure the flight is not delayed.

Figure 3:
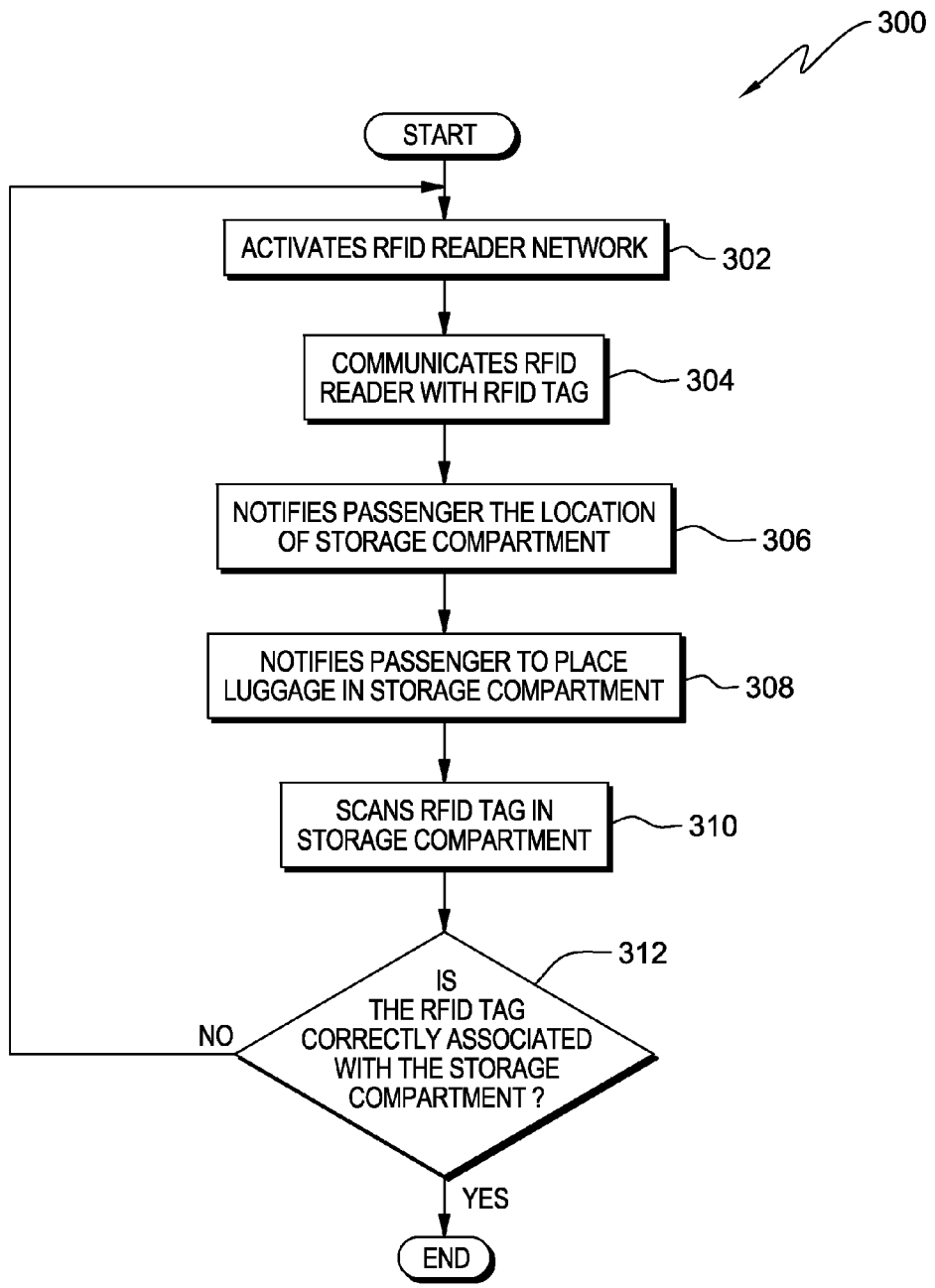
FIG. 3 is a flowchart illustrating steps for storing luggage on a passenger carrier in accordance with an exemplary embodiment of the present invention.

FIG. 3 is luggage storage program 300 which guides a passenger on a passenger carrier to the location associated with RFID tag 108. In an example, a passenger boards an aircraft and as the passengers enters the cabin; RFID tag 108 is activated on luggage 106 by field generator 114. In step 302, luggage storage program 300 activates RFID reader 112. RFID reader 112 is activated before a passenger enters the cabin of the passenger carrier so RFID reader 112 is able to recognize RFID tag 108 attached to luggage 106. RFID reader 112 consists of RFID reader controller 110 with field generator 114 activating RFID tag 108 as they pass through RFID readers 112. In an example, luggage storage program 300 activates RFID reader controller 110 when passengers board an aircraft where an embodiment of the invention is implemented. Activating RFID reader controller 110 activates field generator 114 allowing for RFID reader 112 to analyze every RFID tag 108 passing within the vicinity of RFID reader 112. In step 304, luggage storage program 300 communicates RFID tag 108 with RFID reader 112 as RFID tag 108 passes within the vicinity of RFID reader 112. RFID tag 108 communicating with RFID reader 112 allows for the luggage storage program 300 to determine if RFID tag 108 correctly corresponds with correct RFID reader 112. In step 306, luggage storage program 300 notifies the passenger they are in the vicinity of the storage compartment where luggage 106 is placed. When RFID reader 112 is able to recognize RFID tag 108 attached to luggage 106, the passenger is notified of the match. In an example, luggage storage program 300 notifies the passenger of the match through the use of display 116. An LED light near the seats notifies when luggage 106 passes near the vicinity of associated RFID reader 112.

In step 308, luggage storage program 300 notifies the passenger to place luggage 106 in storage compartment associated with RFID reader 112. The passenger has the ability to associate an RFID reader 112 of where luggage 106 needs to be placed in the storage compartment. The passenger can associate an RFID reader 112 with a given storage compartment through the use of a method which may be but not limited to: a written visual display, an electronic visual display and an audible notification system. In an example embodiment, the passenger using an electronic mobile device 118 can be notified of where luggage 106 with RFID tag 108 can be placed correctly in the cabin storage area of an aircraft.

In step 310, luggage storage program 300 scans RFID tag 108 attached to luggage 106 once it is placed in the storage compartment. In the storage compartment there are additional RFID readers 112 which scan RFID tag 108 as luggage 106 is placed into the storage compartment to see if it matches with correct RFID reader 112. There is a visual display to notify the passenger and the support crew on the passenger carrier, luggage 106 has been placed in the correct location in the storage compartment. In an example, the passenger places luggage 106 into the storage compartment. The passenger closes the storage compartment door and display 116 shows if correct luggage 106 is in the correctly associated storage compartment.

In step 312, luggage storage program 300 determines if luggage 106 placed in the storage compartment is correctly associated with RFID tag 108. In response to luggage 106 being correctly associated with the storage compartment, luggage storage program 300 has finished the process. In response to luggage 106 being incorrectly associated with the storage compartment, luggage storage program 300 has to orientate back to step 302 wherein the passenger will have to pass through RFID reader network to re-establish an association between RFID reader 112 and RFID tag 108.

Figure 4:
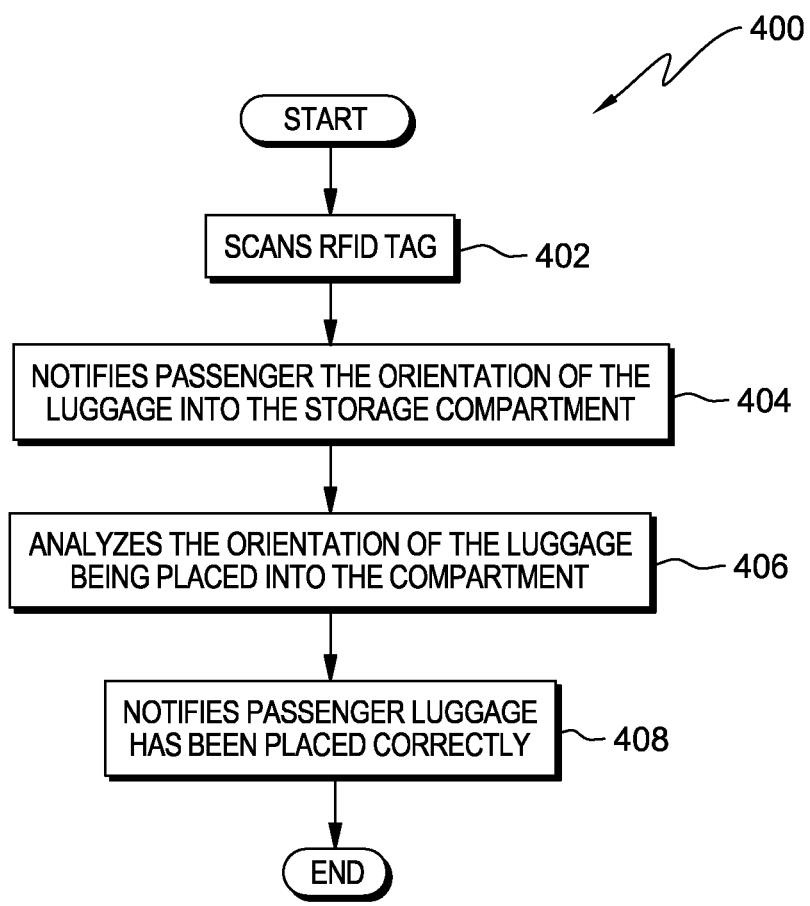
FIG. 4 is a flowchart illustrating steps for optimally orienting luggage in a storage compartment in accordance with an exemplary embodiment of the present invention.

FIG. 4 is luggage orientation program 400 notifies the passenger the optimal orientation of luggage 106 in the storage compartment. In an example embodiment, luggage orientation program 400 can work along side luggage storage program 300 to better utilize passenger loading efficiency. In step 402, luggage orientation program 400 scans RFID tag 106 by the use of RFID reader 112. Scanning RFID tag 108, luggage orientation program 400 determines the optimal orientation for that particular luggage 106 since every RFID tag 108 is unique. In another embodiment, the process of identifying which orientation is best for a piece of luggage 106 being placed into a storage compartment is also part of luggage storage program 300.

In step 404, luggage orientation program 400 notifies the orientation of luggage 106 into the storage compartment. Gathering the information from RFID tag 108 scan, the passenger is notified the optimal orientation of luggage 106. In an example, an aircraft with implemented luggage orientation program 400 works along side an application program on electronic mobile device 118. A passenger boarding an aircraft places luggage 106 into an overhead storage compartment when RFID tag 108 is read. The orientation information of luggage 106 is retrieved and the information is sent to electronic mobile device 118 through the application program being used by the passenger. Electronic mobile device 118 has an image of the compartment and an example luggage 106 image to show the orientation of luggage 106 in the overhead storage compartment. In another example, a passenger boards an aircraft and locates corresponding overhead storage compartment with RFID tag 108. Once at the correct location, the passenger places luggage 106 into the overhead storage compartment. Once placed into the overhead storage compartment, RFID tag 108 is scanned and orientation for luggage 106 is retrieved. An external LCD display above the overhead storage compartment notifies the passenger how luggage 106 needs to be oriented in the overhead storage compartment.

Step 406, luggage orientation program 400 analyzes the orientation of luggage 106 being placed into the storage compartment. In an example, after the passenger orients luggage 106 according to the notification provided to the passenger in step 404, the orientation is analyzed. Luggage orientation program 400 analyzes the orientation based on the weight distribution in the storage compartment where luggage 106 is placed. The weight distribution for every storage compartment is established when every passenger boarding the aircraft check-ins luggage 106. As the passenger checks-in luggage 106, the weight of luggage 106 is recorded and assigned to a location inside the storage compartment. This weight distribution is used to compare the orientated weight distribution after the passenger places luggage 106 into the storage compartment.

In step 408, luggage orientation program 400 notifies the passenger luggage 106 has been orientated correctly in the storage compartment. In an example, if the weight distribution of the storage compartment matches what luggage orientation program 400 established, it then notifies the passenger the orientation of luggage 106 is correct. External display 116 notifies the passenger how to orient luggage 106 in the storage compartment also notifies the passenger if the orientation of luggage 106 is correct. In another example, an application on electronic mobile device 118 controlled by the passenger notifies whether the orientation of luggage 106 in the storage compartment is correct. In response to notifying the passenger the orientation of luggage 106 in the storage compartment is correct, luggage orientation program 400 concludes operations.

Luggage orientation program 400 has the ability for passengers to enter their luggage orientation preferences at check-in. In an example, a passenger checks-in a piece of luggage 106 and specifies the piece of luggage 106 must be placed up-right with no other piece of luggage 106 placed on top. The preferences are saved in luggage orientation program 400 for the particular passenger making the request. The information is associated with RFID tag 108 being place on luggage 106. The preference of luggage orientation does hinder the utilization of maximum space in the storage compartment area in the interior of a passenger carrier.

Figure 5A:
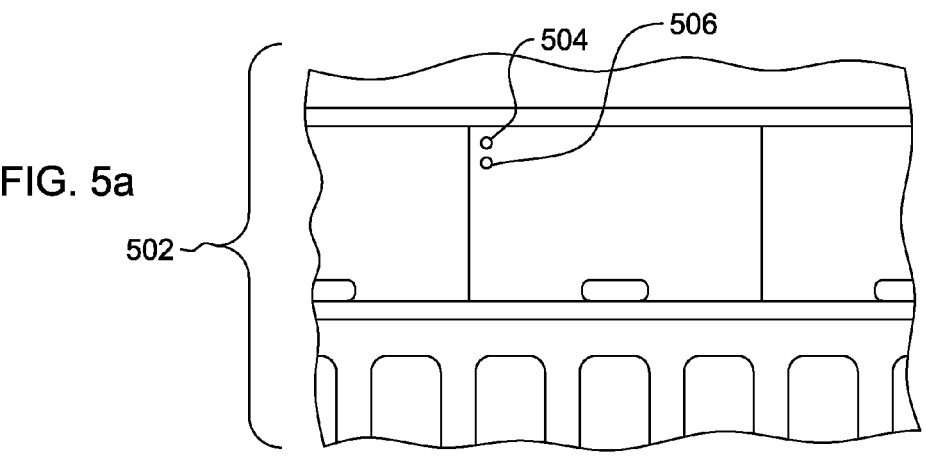
FIGS. 5a-5c illustrate examples of storage compartments embodying aspects of the invention in accordance with an exemplary embodiment of the present invention.
Figure 5B:
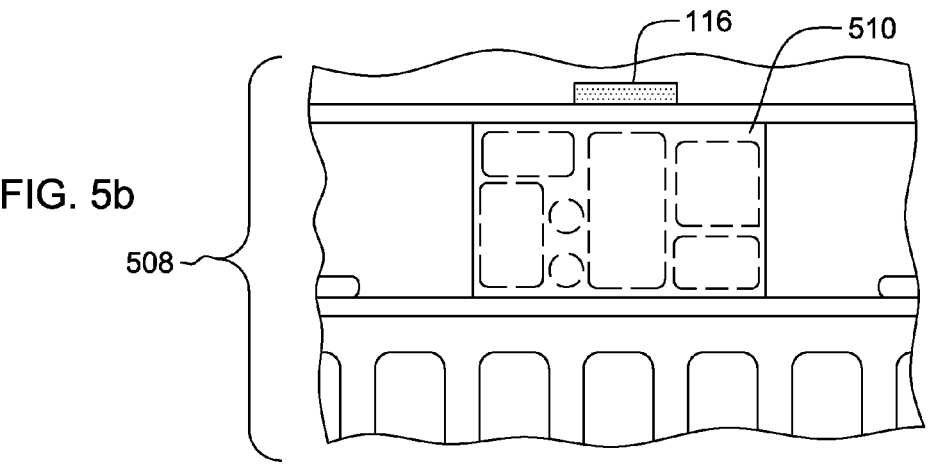
Figure 5C:
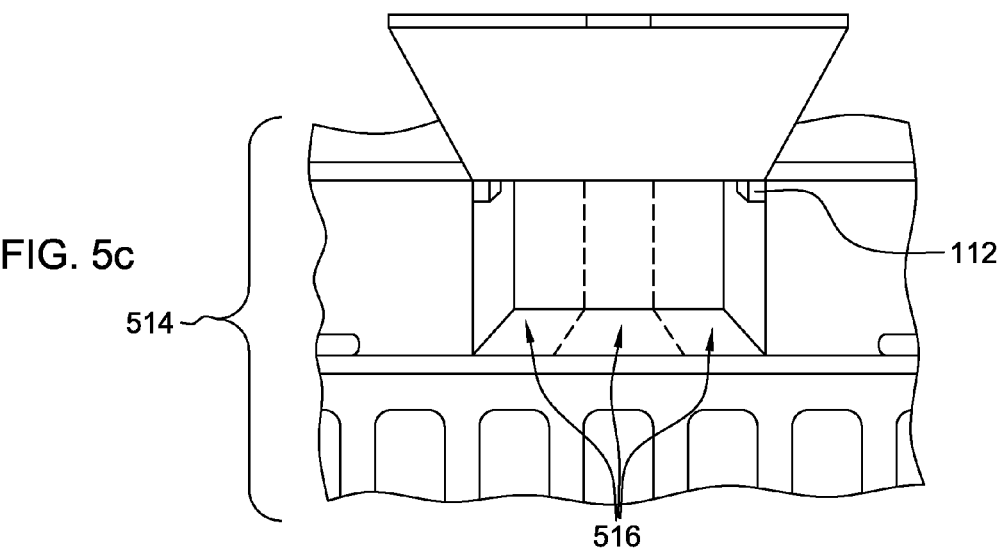

FIGS. 5a-5c include three possible implementations of one embodiment of the invention. In FIG. 5a, luggage compartment 502 includes a red LED 504 and a green LED 506. In FIG. 5b, luggage compartment 508 includes visual display 116 and an example of luggage orientation 510. In FIG. 5c, luggage compartment 514 includes RFID reader 112 and a designated loading section 516.

FIGS. 5a-5c are a set of three possible embodiments of the inventions. In FIG. 5a, luggage compartment 502 has a two LED notification system. Red LED 504 provides the passenger various information pending the point in the boarding process of the passenger. In an example, a passenger walking down the aisle of an aircraft looks at lit red LED 504 and determines the storage compartment with the lit red LED 504 does not belong to luggage 106. Red LED 504 notifies the passenger luggage 106 has been placed into the wrong storage compartment and red LED 504 notifies the passenger luggage 106 is orientated incorrectly if luggage 106 interferes with the proper closing of the storage compartment. Green LED 506 operates in the opposite matter of red LED 504. In an example, a passenger down the aisle of an aircraft looks at lit green LED 506 and determines the storage compartment with lit green LED 506 corresponding to correct luggage 106. Green LED 506 notifies the passenger luggage 106 has been placed into the correct storage compartment and green LED 506 notifies the passenger luggage 106 is oriented correctly in the storage compartment.

In FIG. 5b, luggage compartment 508 illustrates an embodiment of the invention with an orientation notification system implemented on a storage compartment. Luggage orientation 510 is an example of how luggage 106 is placed into luggage compartment 508. Luggage orientation program 400 determines luggage orientation 510 and visually displays the orientation on display 116. In an example, external display 116 is an LCD screen. Display 116 shows a visual representation of luggage 106 and an animation of how it needs to be oriented correctly in luggage compartment 508 in order to maximize the available storage compartment space.

In FIG. 5c, an internal view of an example embodiment of the invention is illustrated in 514. The interior of the storage compartment contains one or more RFID readers 112 to scan any RFID tag 108 luggage 106 which is place inside the storage compartment. RFID readers 112 read RFID tag 108 as luggage 106 is being pushed into the storage compartment. The interior of the luggage compartment consists of the designated loading sections 516 where luggage 106 is placed according to luggage storage program 300 and luggage orientation program 400. Each coordinated section is associated with an RFID tag 108 attached to luggage 106. In an example, a storage compartment has designated loading sections 516 which are color coordinated. Each colored section is used to assign storage compartment space in when storing luggage 106 in the interior of a passenger carrier.

Figure 6:
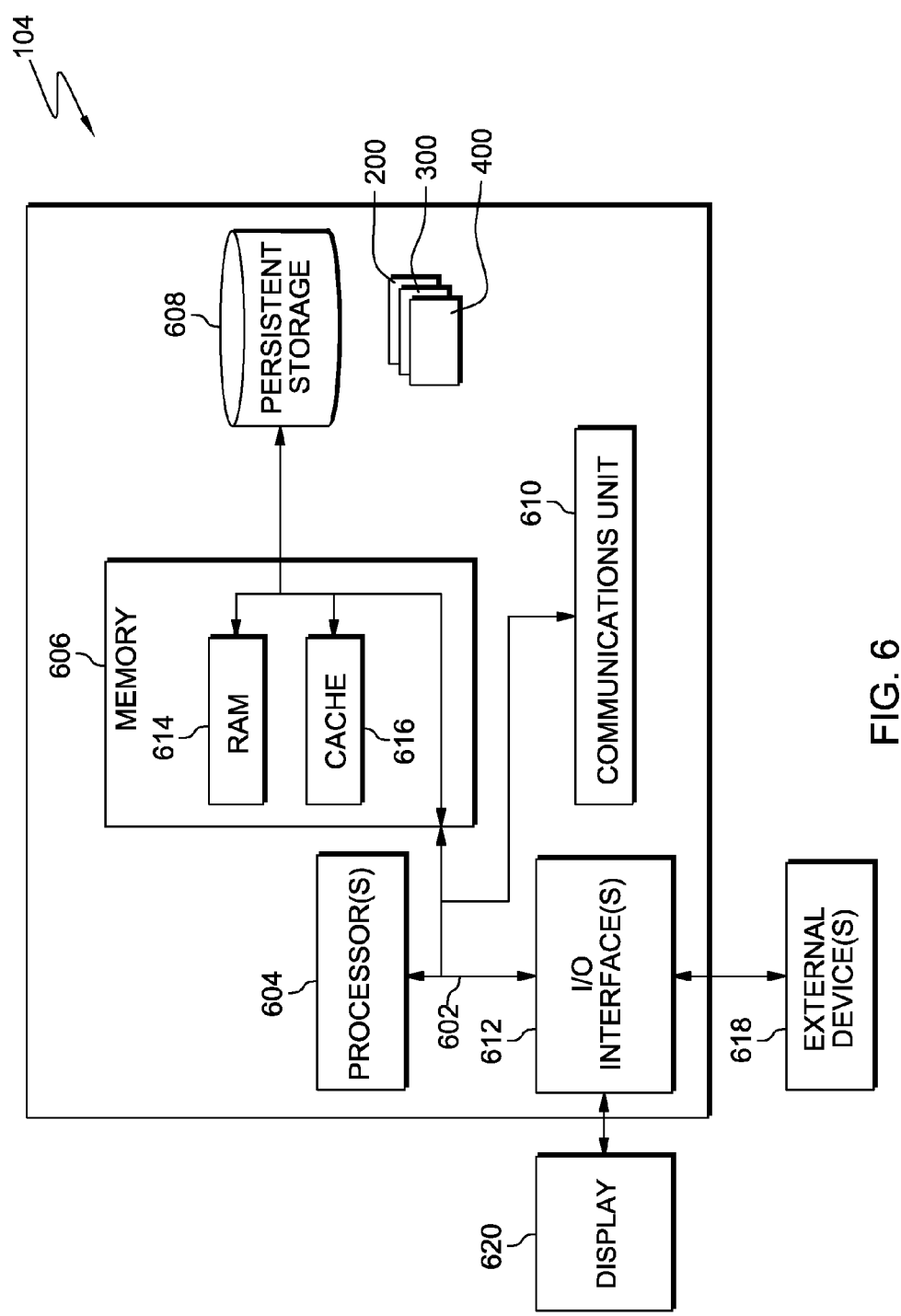
FIG. 6 illustrates a block diagram of hardware and software included in the system of FIG. 1 in accordance with an exemplary embodiment of the present invention.

FIG. 6 depicts a block diagram of components of server computer 104 in accordance with an illustrative embodiment. It should be appreciated that FIG. 6 provides only an illustration of one implementation and does not imply any limitations with regard to the environment in which different embodiments may be implemented. Many modifications to the depicted environment may be made.

Server computer 104 includes communications fabric 602, which provides communications between processor(s) 604, memory 606, persistent storage 608, communications unit 610, and input/output (I/O) interface(s) 612.

Memory 606 and persistent storage 608 are examples of computer-readable tangible storage devices. A storage device is any piece of hardware that is capable of storing information, such as, data, program code in functional form, and/or other suitable information on a temporary basis and/or permanent basis. Memory 606 may be, for example, one or more random access memories (RAM) 614, cache memory 616, or any other suitable volatile or non-volatile storage device.

RFID tag assignment program 200, luggage storage program 300 and luggage orientation program 400 is stored in persistent storage 608 for execution by one or more of the respective processors 604 via one or more memories of memory 606. In the embodiment illustrated in FIG. 6, persistent storage 608 includes flash memory. Alternatively, or in addition to, persistent storage 608 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 608 may also be removable. For example, a removable hard drive may be used for persistent storage 608. Other examples include an optical or magnetic disk that is inserted into a drive for transfer onto another storage device that is also a part of persistent storage 608, or other removable storage devices such as a thumb drive or smart card.

Communications unit 610, in these examples, provides for communications with other data processing systems or devices. In these examples, communications unit 610 includes one or more network interface cards. Communications unit 610 may provide communications through the use of either or both physical and wireless communications links. In another embodiment still, server computer 104 may be devoid of communications unit 610. RFID tag assignment program 200, luggage storage program 300 and luggage orientation program 400 may be downloaded to persistent storage 608 through communications unit 610.

I/O interface(s) 612 allows for input and output of data with other devices that may be connected to server computer 104. For example, I/O interface 612 may provide a connection to external devices 618 such as a keyboard, keypad, a touch screen, and/or some other suitable input device. I/O interface(s) may also connect to a display 620.

Display 620 provides a mechanism to display data to a user and may be, for example, a computer monitor.

Based on the foregoing, a method, computer system, and computer program product have been disclosed for automatically assigning a location to a luggage belonging to a passenger in a passenger carrier. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. Therefore, the present invention has been disclosed by way of example and not limitation.

The invention claimed is:

1. A method for automatically assigning a location to a luggage belonging to a passenger in a passenger carrier, the method comprising steps of:

a computer system evaluating characteristics of the luggage;

the computer system evaluating characteristics of the passenger;

the computer system assigning a luggage storage area within a passenger area, wherein the luggage storage area is associated with an RFID tag of the luggage based at least in part on passenger characteristics including one or more of: passenger age, whether the passenger is traveling with children, personality of the passenger, limited mobility of the passenger, type of luggage, and gender of the passenger; and the computer system confirming the luggage being correctly located in the assigned luggage storage area.

2. The method of claim 1, wherein the passenger carrier is selected from the group consisting of: a passenger aircraft, a passenger bus, a passenger train, and a nautical passenger transporter.

3. The method of claim 1, wherein the step of the computer system confirming the luggage being correctly located in the assigned location includes the steps of:

identifying the RFID tag is in a vicinity of the associated location;

retrieving orientation information associated with the RFID tag; and notifying the passenger an intended orientation of the luggage in the location associated with an RFID.

4. The method of claim 1, wherein an electronic mobile device notifies the passenger the location associated with the RFID tag.

5. The method of claim 1, wherein the location associated with an RFID is divided into coordinated loading sections.

6. The method of claim 1, wherein the location associated with an RFID includes a visual display for notifying the passenger a piece of luggage is correctly located in the location associated with an RFID.

7. The method of claim 1, wherein the luggage assignment to the location associated with the RFID tag is based at least in part on a weight distribution of the passenger carrier.

8. The method of claim 1, further comprising receiving a request from the passenger for the location associated with the RFID tag.

9. A computer program product comprising:
one or more computer-readable storage media and program instructions stored on at least one of the one or more computer-readable storage media, the program instructions comprising;
program instructions to evaluate characteristics of the luggage;
program instructions to evaluate characteristics of the passenger;
program instructions to assign a luggage storage area within a passenger area, wherein the luggage storage area is associated with an RFID tag of the luggage based at least in part on passenger characteristics including one or more of: passenger age, whether the passenger is traveling with children, personality of the passenger, limited mobility of the passenger, type of luggage, and gender of the passenger;
program instructions to confirm the luggage being correctly located in the assigned luggage storage area; and
wherein at least one of the steps is carried out using a computing device.

10. The computer program product of claim 9, wherein the passenger carrier is selected from the group consisting of: a passenger aircraft, a passenger bus, a passenger train, and a nautical passenger transporter.

11. The computer program product of claim 9, wherein the step of the computer system confirming the luggage being correctly located in the assigned location includes the steps of:
program instruction to identify the RFID tag is in a vicinity of the associated location;
program instructions to retrieve orientation information associated with the RFID tag; and
program instructions to notify the passenger an intended orientation of the luggage in the location associated with an RFID.

12. The computer program product of claim 9, wherein an electronic mobile device notifies the passenger the location associated with the RFID tag.

13. The computer program product of claim 9, wherein the location associated with an RFID is divided into coordinated loading sections.

14. The computer program product of claim 9, wherein the location associated with an RFID includes a visual display for notifying the passenger a piece of luggage is correctly located in the location associated with an RFID.

15. The computer program product of claim 9, wherein the luggage assignment to the location associated with the RFID tag is based at least in part on a weight distribution of the passenger carrier.

16. The computer program product of claim 9, further comprising program instructions to receive a request from the passenger for the location associated with the RFID tag.

17. A computer system comprising:
one or more processors, one or more computer-readable memories and one or more computer-readable storage media, and program instructions, stored on at least one of the one or more storage media for execution by at least one of the one or more processors via at least one of the one or more computer-readable memories, the program instructions comprising:
program instructions to evaluate characteristics of the luggage;
program instructions to evaluate characteristics of the passenger;
program instructions to assign a luggage storage area within a passenger area, wherein the luggage storage area is associated with an RFID tag of the luggage based at least in part on passenger characteristics including one or more of: passenger age, whether the passenger is traveling with children, personality of the passenger, limited mobility of the passenger, type of luggage, and gender of the passenger;
program instructions to confirm the luggage being correctly located in the assigned luggage storage area; and
wherein at least one of the steps is carried out using a computing device.

18. The computer system of claim 17, wherein the step of the computer system confirming the luggage being correctly located in the assigned location includes the steps of:
program instruction to identify the RFID tag is in a vicinity of the associated location;
program instructions to retrieve orientation information associated with the RFID tag; and
program instructions to notify the passenger an intended orientation of the luggage in the location associated with an RFID.

19. The computer system of claim 17, wherein an electronic mobile device notifies the passenger the location associated with the RFID tag.

20. The computer system of claim 17, wherein the location associated with an RFID includes a visual display for notifying the passenger a piece of luggage is correctly located in the location associated with an RFID.

* * * * *